United States Patent
High et al.

(10) Patent No.: US 10,515,505 B2
(45) Date of Patent: *Dec. 24, 2019

(54) APPARATUS AND METHOD FOR MOBILE VENDING

(71) Applicant: Walmart Apollo, LLC, Bentonville, AR (US)

(72) Inventors: Donald R. High, Noel, MO (US); Brian G. McHale, Chadderton Oldham (GB); Michael D. Atchley, Eureka Springs, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/352,671

(22) Filed: Mar. 13, 2019

(65) Prior Publication Data

US 2019/0206175 A1 Jul. 4, 2019

Related U.S. Application Data

(63) Continuation of application No. 15/648,059, filed on Jul. 12, 2017.

(Continued)

(51) Int. Cl.
*G07F 11/00* (2006.01)
*G01C 21/36* (2006.01)
*G01C 21/34* (2006.01)

(52) U.S. Cl.
CPC ............ *G07F 11/00* (2013.01); *G01C 21/343* (2013.01); *G01C 21/362* (2013.01); *G01C 21/3605* (2013.01)

(58) Field of Classification Search
CPC ... G07F 11/00; G01C 21/343; G01C 21/3605; G01C 21/362

(Continued)

(56) References Cited

U.S. PATENT DOCUMENTS 4,678,390 A 7/1987 Bonneton
6,345,852 B1 2/2002 McCarthy
(Continued)

FOREIGN PATENT DOCUMENTS

JP 4975693 B2 2/2010

OTHER PUBLICATIONS

Cukrov, Claudia; "MUJI Noel Vending Machine", PSFK, https://www.psfk.com/2010/12/muji-noel-vending-machine.html, Dec. 20, 2010, pp. 1-2.

(Continued)

*Primary Examiner* — Michael Collins
(74) *Attorney, Agent, or Firm* — Fitch, Even, Tabin & Flannery LLP

(57) ABSTRACT

Systems, apparatuses, and methods are provided herein for mobile vending. A system for mobile vending comprises a mobile vending machine comprising: an item dispenser configured to display a plurality of items for purchase, a set of motorized wheels, a navigation sensor device, a communication device, and, a control circuit configured to navigate the mobile vending machine based on navigation instructions; and a central computer system configured to communicate with the mobile vending machine via the communication device, the central computer system being configured to: determine a destination for the mobile vending machine, provide the navigation instructions to the mobile vending machine to cause the mobile vending machine to travel to the destination using the set of motorized wheels and the navigation sensor device.

17 Claims, 4 Drawing Sheets

Related U.S. Application Data

(60) Provisional application No. 62/377,089, filed on Aug. 19, 2016.

(58) Field of Classification Search
USPC .................................................. 700/231–244
See application file for complete search history.

(56) References Cited

U.S. PATENT DOCUMENTS

| | | | |
|---|---|---|---|
| 6,584,375 B2 | 6/2003 | Bancroft | |
| 6,895,301 B2 | 5/2005 | Mountz | |
| 7,364,050 B2 | 4/2008 | Guard | |
| 8,509,947 B2 | 8/2013 | Jarisch | |
| 9,043,012 B2 | 5/2015 | Davey | |
| 9,248,403 B2 | 2/2016 | Udatsu | |
| 9,520,012 B2 | 12/2016 | Stiernagle | |
| 9,550,577 B1 | 1/2017 | Beckman | |
| 9,573,684 B2 | 2/2017 | Kimchi | |
| 10,275,975 B2 | 4/2019 | High | |
| 2002/0050526 A1 | 5/2002 | Swartz | |
| 2002/0125263 A1 | 9/2002 | Credle | |
| 2004/0019406 A1 | 1/2004 | Wang | |
| 2005/0060063 A1 | 3/2005 | Reichelt | |
| 2007/0299555 A1* | 12/2007 | Walker | G07F 9/02 700/231 |
| 2010/0100241 A1* | 4/2010 | Jarisch | A47J 31/407 700/259 |
| 2010/0234990 A1* | 9/2010 | Zini | G05B 19/41895 700/245 |
| 2012/0104785 A1 | 5/2012 | Hixson | |
| 2013/0274917 A1 | 10/2013 | Shimmerlik | |
| 2014/0277136 A1 | 9/2014 | Stein | |
| 2015/0051990 A1 | 2/2015 | Bubley | |
| 2015/0277440 A1 | 10/2015 | Kimchi | |
| 2016/0196755 A1 | 7/2016 | Navot | |
| 2016/0257401 A1 | 9/2016 | Buchmueller | |
| 2017/0011580 A1* | 1/2017 | Huang | G06Q 10/30 |
| 2017/0110017 A1 | 4/2017 | Kimchi | |
| 2018/0053369 A1* | 2/2018 | High | G01C 21/343 |

OTHER PUBLICATIONS

Davidson, Lauren; "The vending machine of the future is here, and it knows who you are", The Telegraph, http://www.telegraph.co.uk/finance/newsbysector/retailandconsumer/11274179/The-vending-machine-of-the-future-is-here-and-it-knows-who-you-are.html, Dec. 8, 2014, pp. 1-3.

Klobuchar, D.J.; "How SAP Connected Retail is Changing the Face of Vending Machines at #SAPtd 2014", https://www.youtube.com/watch?v=FcCKZLoczo4, published on Dec. 5, 2014, pp. 1-6.

PCT; App. No. PCT/US2017/045891; International Search Report and Written Opinion dated Oct. 31, 2017.

Ratkov, Anthony; "Robotic Vending Machines", http://anthonyratkov.com/robotics/robotic_vending_machines, accessed on May 18, 2016, pp. 1-4.

SAP Technology; "Smart Vending Machine Demo at TechCrunch Disrupt 2013", https://www.youtube.com/watch?v=XEz1H-gxLj8, published on Dec. 3, 2013, pp. 1-6.

Sapphire Now; "Smart Vending Machines at Sapphire Now", https://www.youtube.com/watch?v=vBP8QKUAK1g, published on Jun. 5, 2014, pp. 1-6.

U.S. Appl. No. 15/648,059; Notice of Allowance dated Dec. 27, 2018.

U.S. Appl. No. 15/648,059; Office Action dated Jun. 8, 2018.

\* cited by examiner

APPARATUS AND METHOD FOR MOBILE VENDING

CROSS-REFERENCE TO RELATED APPLICATION

This application is a continuation of U.S. application Ser. No. 15/648,059, filed Jul. 12, 2017, entitled APPARATUS AND METHOD FOR MOBILE VENDING, which claims the benefit of U.S. Provisional Application No. 62/377,089, filed Aug. 19, 2016, all of which are incorporated herein by reference in their entirety.

TECHNICAL FIELD

This invention relates generally to vending machines.

BACKGROUND

A vending machine generally refers to a machine that dispenses items after the customer inserts currency or credit into the machine.

BRIEF DESCRIPTION OF THE DRAWINGS

Disclosed herein are embodiments of apparatuses and methods for mobile vending. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for providing mobile vending. A system for mobile vending comprises a mobile vending machine comprising: an item dispenser configured to display a plurality of items for purchase, a set of motorized wheels, a navigation sensor device, a communication device, and, a control circuit configured to navigate the mobile vending machine based on navigation instructions; and a central computer system configured to communicate with the mobile vending machine via the communication device, the central computer system being configured to: determine a destination for the mobile vending machine, provide the navigation instructions to the mobile vending machine to cause the mobile vending machine to travel to the destination using the set of motorized wheels and the navigation sensor device.

Figure 1:
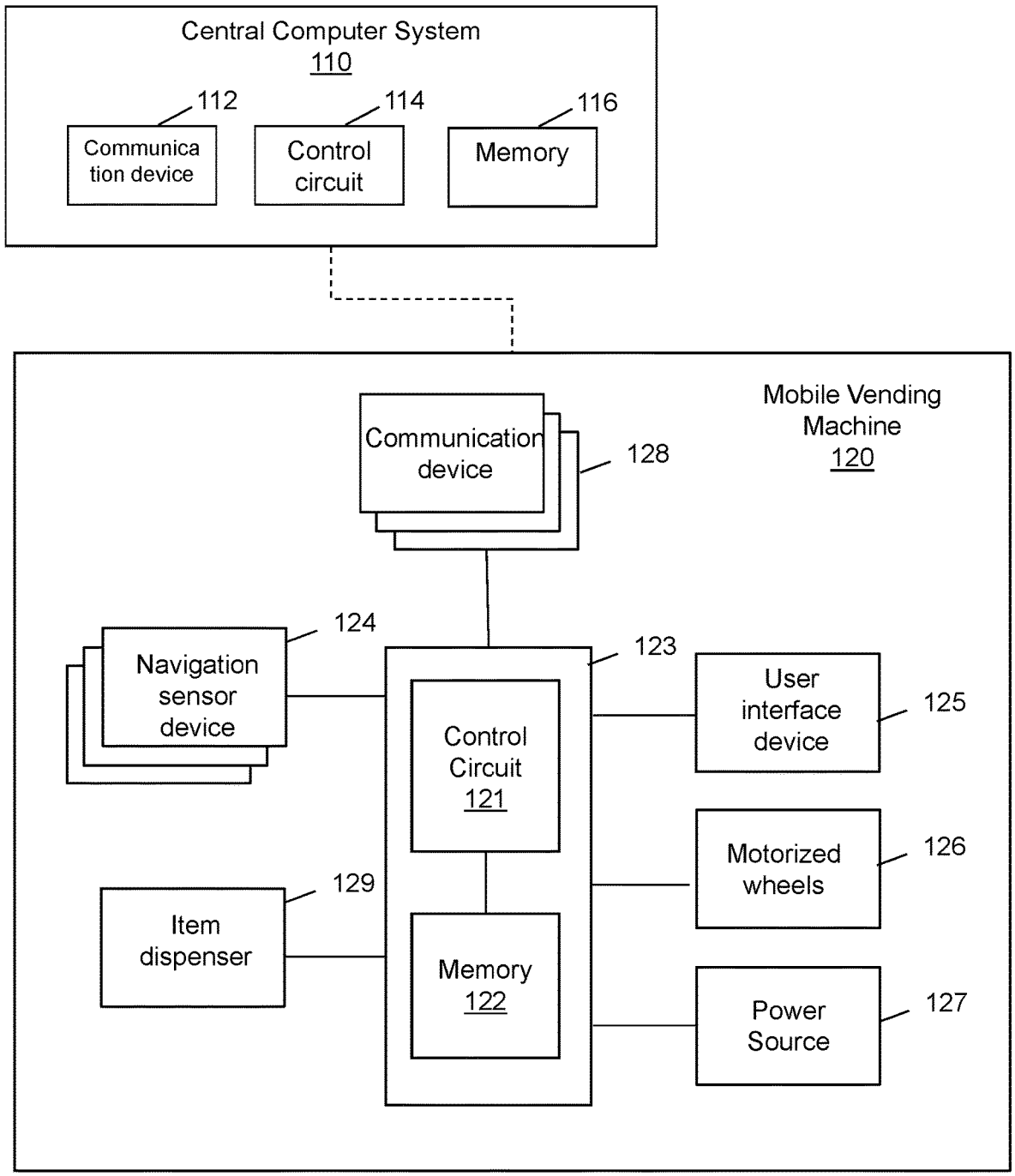
FIG. 1 is a block diagram of a system in accordance with several embodiments.

Referring now to FIG. 1, a system for providing mobile vending is shown. The system comprises a mobile vending machine (MVM) 120 and a central computer system 110.

In some embodiments, an MVM 120 may comprise a vending machine that is configured to travel to various locations and/or within various venues while unmanned. In some embodiments, the MVM 120 may be configured to vend items in a destination venues such as a sports event, a fair, a concert, a park, a school, a residential area, a customer location, etc. In some embodiments, the MVM 120 may comprise an autonomous or semi-autonomous vehicle configured to travel on the automobile roadway and/or other paths such as sidewalks and bike lanes. In some embodiments, the MVM 120 may comprise a housing enclosing and/or coupled to one or of more of a control unit 123 comprising a control circuit 121 and a memory 122, a navigation sensor device 124, a user interface device 125, motorized wheels 126, a power source 127, a communication device 128, and an item dispenser 129.

The control circuit 121 may comprise a central processing unit, a processor, a microprocessor, and the like. The control circuit 121 may be configured to execute computer readable instructions stored on the computer readable storage memory 122. The computer readable storage memory 122 may comprise volatile and/or non-volatile memory and have stored upon it a set of computer readable instructions which, when executed by the control circuit 121, causes the control circuit 121 to drive and steer the MVM 120 with the motorized wheels 126 based on navigation instructions received from the central computer system 110. In some embodiments, the control unit 123 may further be configured to control the dispensing of items from the item dispenser 129 based on user inputs received via the user interface device 125. In some embodiments, the control unit 123 may be configured keep track of the inventory level of one or more items in the item dispenser 129 and communicate inventory information to the central computer system 110. In some embodiments, the control unit 123 may be configured to display content (e.g. item descriptions, advertisements, promotions, store information, news, event information, etc.) to customers via the user interface device 125. In some embodiments, the control unit 123 may be configured to cause the user interface device 125 to display an alternate vending machine location for an item not available and/or sold out at the MVM. In some embodiments, the memory 122 may further store data for a displaying one or more of images, videos, advertisements, promotions, and store directions via the user interface device 125. In some embodiments, content may be streamed and/or downloaded from the central computer system 110 to the MVM 120 for display. In some embodiments, the computer executable instructions may cause the control circuit 121 of the MVM 120 to perform one or more steps in the methods and processes described with reference to FIGS. 2 and 4 herein.

The navigation sensor device 124 may comprise one or more types of sensor devices for gathering data from the surrounding of the MVM 120 to navigate the MVM 120. In some embodiments, the navigation sensor device 124 may comprise one or more of a GPS sensor, an infrared scanner, a motion detector, a laser distance measurer, a sonar, a location sensor, a proximity sensor, an obstacle detector, a range sensor, an image sensor, a sound sensor, a light sensor, a weather sensor, a data receiver, and the like. In some embodiments, the navigation sensor device 124 may be configured to detect for potential collisions with objects, persons, and/or other vehicles. In some embodiments, the navigation sensor device 124 may be configured to detect for terrain and road conditions to avoid steering the MVM 120 into a ditch and/or off a curb. In some embodiments, the navigation sensor device 124 may be configured to collect information relating to characteristics of one or more of detected persons, detected animals, detected objects, road condition, weather condition, etc. In some embodiments, the navigation sensor device 124 may comprise sensors pointed towards the ground and/or outward towards areas around the MVM.

The user interface device 125 may comprise one or more user input/output devices configured to allow a customer to select at least an item from the plurality of items displayed in the item dispenser to purchase and/or submit payments for purchase. In some embodiments, the user interface device 125 may comprise one or more of a touchscreen, a see-through touch screen, a keypad, one or more buttons, a display screen, a microphone, a speaker, and the like. In some embodiments, a see-through touch screen on an MVM 120 comprises a window to the content of the item dispenser 129 and may be configured to display images and/or an ordering menu that overlays the view of the content of the item dispenser 129 behind the screen. In some embodiments, the window to the content of the item dispenser 129 may comprise a screen configured to turn opaque or translucent to display content and turn transparent to provide a view of the items for sale. In some embodiments, the user interface device 125 may comprise a wireless transceiver configured to wirelessly couple with a user device via a short range wireless protocol such as Bluetooth or via the central computer system 110. The user device may comprise a user interface (e.g. a mobile application, a web browser accessing a website, etc.) configured to communicate with the MVM 120 and/or the central computer system to provide customer's request for an MVM, selection of items, and/or payment. In some embodiments, the MVM 120 may be configured to receive payment via one or more of a cash receiver, a bank card reader, and a mobile payment reader. In some embodiments, the user interface device 125 may comprise one or more payment acceptance devices such as a bank card scanner, a bill receiver, a coin receiver, a mobile payment scanner, a near field communication (NFC) transceiver, a Radio Frequency Identification (RFID) scanner, a biometrics reader, etc. In some embodiments, the user interface device 125 may comprise a navigation alert system configured to provide safety alerts to nearby persons through light and/or sound when potential safety hazard conditions are detected via the navigation sensor device 124.

The motorized wheels 126 may be operated by the control circuit 121 to permit the MVM 120 to travel to and from various vending venues, storage locations, restocking locations, and/or service locations. In some embodiments, the motorized wheels 126 may include at least one powered wheel for moving the MVM 120 through one or more of streets, roadways, sidewalks, driveways, etc. The motorized wheels 126 may include any number of rotating wheels and/or other floor-contacting mechanisms as may be desired and/or appropriate to the application setting. For example, the motorized wheels 126 may comprise components configured to travel on one or more of a pave motor vehicle roadway, a sidewalk, a bike lane, a gravel road, a dirt path, and the like.

The power source 127 may be coupled to one or more of the other components of the MVM 120 to provide power for the operation of the MVM 120. In some embodiments, the power source 127 may comprise as one or more of a rechargeable battery, a replaceable battery, a fuel cell, a solar panel, a fuel tanks, and a power grid connection. The power provided by the power source 127 may be used to power one or more of the control unit 123, the user interface device 125, the motorized wheels 126, the navigation sensor device 124, the item dispenser 129, and the communication device 128 of the MVM 120. In some embodiments, a second power source may be provided to power the motorized wheels 126 and/or the item dispenser 129 mechanisms separate from the power source supporting the electrical components of the MVM 120. In some embodiments, the MVM 120 may include a plug or other electrically conductive interface for connecting with an external source of electrical energy to recharge the power source 127.

The communication device 128 may comprise a wireless communication device configured to allow the control circuit 121 to communicate with a remote system such as the central computer system 110 over a network such as a mobile network, a wireless network, a secured network, a private network, and the Internet. In some embodiments, the communication device 128 may comprise one or more of Wi-Fi transceiver, a mobile data network transceiver, a cellular network transceiver, a satellite network transceiver, and the like.

The item dispenser 129 may comprise one or more compartments for holding one or more items to dispense to customers. In some embodiments, the item dispenser 129 may comprise one or more item securing slots and at least one access door for retrieving dispensed items. In some embodiments, the item dispenser 129 may be configured selectively dispense items based on information received from the user interface device 125. For example, when a selection of an item is received, the control circuit 121 may be configured to verify the submitted payment prior to instructing the item dispenser 129 to release the item. In another example, for orders placed through a customer's personal device, the control circuit 121 may be configured to authenticate a recipient prior to causing the item dispenser 129 to release the purchased item. In some embodiments, the item dispenser 129 comprises a window to the storage compartment through which customers can see products carried by the item dispenser 129 prior to making purchases. In some embodiments, the item dispenser 129 may comprise a cooling and/or heating element for regulating the temperature of the stored items. In some embodiments, the item dispenser 129 may comprise mechanisms similar to conventional vending machines for holding, moving, and/or releasing items.

In some embodiments, the MVM 120 may further comprise a self-loading mechanism configured to restock the item dispenser with products. In some embodiments, the self-loading mechanism may comprise one or more of mechanical arms, conveyor devices, and the like inside or outside of the item dispenser 129. In some embodiments, the mechanisms for dispensing items may further be configured to retrieve items and place items into one or more storage locations of the item dispenser 129.

In some embodiments, one or more of the item dispenser and the user interface device 125 may comprise a separate control unit similar to the control unit 123. For example, the control unit 123 may be configured to control the navigation of the MVM 120 while a separate vending machine control unit may be configured to control and monitor sales via the user interface device 125 and the item dispenser 129. In some embodiments, the navigation controls and the vending machine controls may communicate directly with each other and/or separately communicates with the central computer system 110. In some embodiments, navigation controls and vending machine controls may be implemented as one or more software modules and/or hardware modules on the control unit 123 or another control unit carried on the MVM 120. In some embodiments, the components of the MVM 120 comprises a physically and/or electrically integrated mobile unit.

The central computer system 110 comprises a control circuit 114, a memory 116, and a communication device 112. The central computer system 110 may comprise one or more of a server, a central computing system, a vending service management computer system, and the like. In some embodiments, the central computer system 110 may comprise a system of two or more processor-based devices. The control circuit 114 may comprise a processor, a microprocessor, and the like and may be configured to execute computer readable instructions stored on a computer readable storage memory 116. The computer readable storage memory 116 may comprise volatile and/or non-volatile memory and have stored upon it, a set of computer readable instructions which, when executed by the control circuit 114, causes the central computer system 110 to provide navigation and/or restocking instructions to the MVM 120. In some embodiments, the control circuit 114 may be configured to assist in the navigation of the MVM 120 from an origin location to a destination. In some embodiments, the central computer system 110 may be configured to determine a destination location for the MVM 120 and/or select one or more items to be carried by the MVM 120. In some embodiments, the destination for the MVM 120 may be determined based on one or more of: current date, current time, upcoming events, current content of the item dispenser, locations of a plurality of other MVMs, and sales history at a plurality of locations. In some embodiments, the central computer system 110 may be configured to select a plurality of targeted items to be sold via the MVM 120 at the destination and cause the MVM 120 to travel to a restocking station to be stocked with the plurality of targeted items. In some embodiments, the plurality of targeted items may be selected based on one or more of: current date, current time, upcoming events, contents of a plurality of other MVMs in a region, sales history of a plurality of products at the destination, characteristics of the destination, characteristics of an event associated with the destination, and an estimated demographic associated with the destination. In some embodiments, the central computer system 110 may be configured to send an MVM 120 to a destination location based on customer request. In some embodiments, the central computer system 110 may be configured to monitor a stock level of a content of the item dispenser via a stock sensor on the MVM 120 and/or sales records of the MVM 120 and instruct the MVM 120 to travel to a restocking station based on the inventory level of the item dispenser. In some embodiments, the computer executable instructions may cause the control circuit 114 of the central computer system 110 to perform one or more steps in the methods and processes described with reference to FIGS. 2 and 4 herein.

The communication device 112 of the central computer system 110 may comprise a network interface configured to communicate with one or more MVMs via a network such as the Internet, a private network, a secure network, a mobile network, and the like. In some embodiments, the communication device 112 may comprise a network adapter, a modem, a router, a wireless transceiver, a mobile network transceiver, and the like.

In some embodiments, the central computer system 110 may comprise and/or be coupled to one or more databases such as an MVM database, a venue database, a map database, a product characteristics database, and a customer profile database. In some embodiments, an MVM database may keep track of the current locations and inventories of a plurality of MVMS managed by the central computer system 110. The central computer system 110 may determine the availability of an MVM for a new destination location and/or whether an MVM needs to be restocked based on the MVM database. In some embodiments, a venue database may store location characteristics of a plurality of venues such as upcoming event at or near the location, sales history of a plurality of products at the location, properties of the location, weather forecast at the location, estimated customer demographic of the location and/or an event associated with the location, etc. In some embodiments, a product characteristics database may store product sales history at various location and/or under various conditions, product attributes, product characteristics, etc. In some embodiments, the central computer system 110 may use the information in the location database and/or product characteristics database to select deployment locations for MVMs and/or items to stock in MVMs. For example, for a sporting event, merchandise associated with the competing teams may be selected for an MVM going to the sports venue. In another example, if a large number of young children is expected at an event and/or a location (e.g. playground, children's concert, amusement part, etc.), child-friendly items (e.g. juice boxes, fruit slices, etc.) may be selected for an MVM 120 going to that location. In yet another example, if a rainy day is expected at a location, umbrellas and ponchos may be stocked in an MVM 120 heading to that location. A customer profile database may store profiles of customer comprising one or more of customer demographic information, customer location history information, and customer purchase history. In some embodiments, a location of the MVM 120 may be selected based on likely locations of potential customers. In some embodiments, items may be selected for an MVM 120 based on past purchase histories of customers at a location. In some embodiments, the map database may comprise one or more roadmaps of serviced areas and/or traffic conditions that can be used to provide navigation instructions to the MVM 120.

While one MVM is shown in FIG. 1, the central computer system 110 may be configured to simultaneously communicate with a plurality of MVMs in the system. In some embodiments, the central computer system 110 may determine a location and/or products for an MVM 120 based on the location and/or inventory of other MVMs. In some embodiments, the MVM 120 may be configured to navigate towards a destination and/or sell products without maintaining data connectivity with the central computer system 110. For example, the MVM 120 may initially retrieve a path to a destination and rely on the navigation sensor device 124 to navigate towards the destination. In some embodiments, the MVM 120 may relay sales information of the item dispenser 129 and/or navigation records to the central computer system 110 for record keeping.

Figure 2:
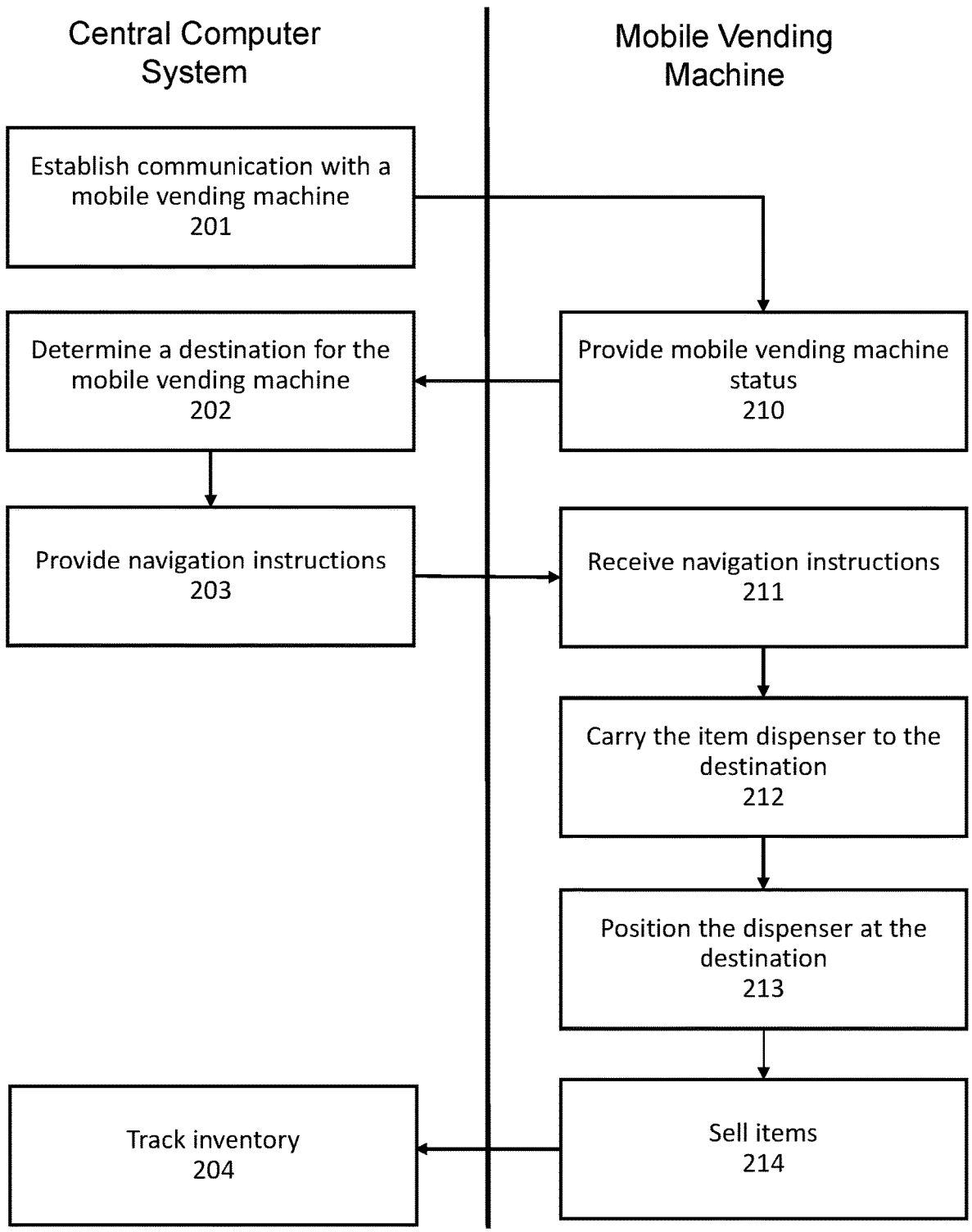
FIG. 2 is a flow diagram of a method in accordance with several embodiments.

Referring now to FIG. 2, a method for operating an MVM is shown. Generally, the method shown in FIG. 2 may be implemented with a processor-based device such as a control circuit, a central processor, and the like. In some embodiments, the method shown in FIG. 2 may be implemented with the control unit 123 of the MVM 120 and/or a processor-based server device such as the central computer system 110 described with reference to FIG. 1 herein.

In step 201, the central computer system establishes communication with an MVM. In some embodiments, the communication may be established through a mobile data network, an MVM storage/charging location network, a satellite data network, a Wi-Fi network, the Internet, etc. In some embodiments, each MVM managed by the central computer system may be assigned an MVM unique identifiers and the central computer system may be configured to constantly and/or periodically update the status of a plurality of MVM in an MVM database through wired or wireless communications. In some embodiments, the central computer system in FIG. 2 may comprise the central computer system 110 described with reference to FIG. 1 or a similar device.

In step 210, the MVM provides MVM status to the central computer system. In some embodiments, the status may comprise whether the MVM is being serviced, being charged, ready for deployment, deployed, traveling, offline, etc. In some embodiments, the MVM status may comprise one or more of MVM's current power level, current inventory, current location, current travel conditions, current sensor readings, etc. In some embodiments, the MVM in FIG. 2 may comprise the MVM 120 described with reference to FIG. 1 or a similar device.

In step 202, the system determines a destination for the MVM. In some embodiments, the destination for the MVM may be determined based on one or more of: current date, current time, upcoming events, current content of the item dispenser, locations of a plurality of other MVMs, and sales history at a plurality of locations. In some embodiments, the destination may correspond to a customer requesting one or more items carried by the MVM via a user interface. In some embodiments, in step 202, the central computer system may further be configured to select a plurality of targeted items to be sold via the MVM at the destination and cause the vending machine to travel to a restocking station to be stocked with the plurality of targeted items. In some embodiments, the plurality of targeted items may be selected based on one or more of: current date, current time, upcoming events, contents of a plurality of other MVMs in a region, sales history of a plurality of products at the destination, characteristics of the destination, characteristics of an event associated with the destination, an estimated demographic associated with the destination, etc. If one or more items needs to be added to the item dispenser, the central computer system may instruct the MVM to travel to a restocking station prior to traveling to the selected destination. In some embodiments, the MVM further be instructed to remove some of its original content at the restocking station or another location prior to traveling to the destination. In some embodiments, a restocking location may comprise one or more of an MVM service station, a retail store, a storage location, a warehouse, a supplier location, etc. In some embodiments, the MVM may comprise a self-loading mechanism configured to load items into the item dispenser. For example, the MVM may comprise mechanical arms and/or conveyor devices for receiving items. In some embodiments, the central computer system may generate human language instructions for associates and/or machine instructions for automated item retrieval/loading mechanisms at the restocking station for stocking the MVM.

In step 203, the system provides navigation instructions to the MVM. In some embodiments, the navigation instructions may be determined based on one or more of the destination location, current traffic condition, expected weather condition, road condition, roadway availability for MVM vehicle type, etc. In some embodiments, the navigation instructions may comprise stops at one or more of a recharging, cleaning, servicing, and restocking locations. In step 211, the MVM receives the navigation instructions from the central computer system. In some embodiments, the navigation instruction may comprise one or more destination locations and/or a planned path to the destinations.

In step 212, the MVM carries the item dispenser to the destination. In some embodiments, the MVM may navigate to the destination based on an initially received navigation instructions and onboard navigation sensor devices. In some embodiments, the MVM may maintain at least periodic communication with the central computer system to assist in the navigation to the destination. In some embodiments, the MVM may be configured to stop in response to requests from nearby persons. For example, a customer may make a verbal command to the MVM (e.g. "stop") or use a personal device to communication with the MVM to cause the MVM to stop so that the customer can make a purchase from the MVM while the MVM traveling to another destination.

In step 213, the system arrives at the destination and positions the item dispenser to sell items. In some embodiments, the position and/or the orientation of the MVM at the destination may be determined by the central computer system. In some embodiments, the MVM may detect for nearby structures and foot traffic conditions at the destination to select a parking location and/or orientation. Generally, the MVM may be configured to place and orient the item dispenser to allow customers to view and make purchases from the item dispenser. For example, the item dispenser may be oriented such that the window to the content of the dispenser faces away from a wall and towards an area with heavy foot traffic. In some embodiments, the MVM may be configured to locate a particular customer at the destination and position itself near the customer once the customer is located. In some embodiments, customer location may be determined based on customer input and/or the GPS location of a customer mobile device. In some embodiments, the MVM may be configured to periodically move between two or more locations within a destination venue to cover a larger area.

In step 214, the MVM begins to sell items through the item dispenser. In some embodiments, the item dispenser may be configured to receive payment for one or more of the plurality of items and release the one or more of the plurality of items in response to the payment. In some embodiments, the item dispenser may be configured to receive payment via one or more of a cash receiver, a bank card reader, and a mobile payment reader. In some embodiments, the MVMs may further be configured to communicate with the central computer system and/or a third party payment system to process payments received from the customer. In some embodiments, the item dispenser remains attached and/or integrated with the MVM at the destination while items are sold to customers.

In some embodiments, the MVM comprises a user interface device configured to allow a customer to select at least an item from the plurality of items displayed in the item dispenser to purchase. In some embodiments, if a customer request an item not available at the MVM, the MVM may communicate with the central computer system to locate an alternate vending machine location that offers the item and communication the alternate vending machine information to the customer via the user interface device of the MVM. In some embodiments, the user interface device may display a direction to the alternate MVM. In some embodiments, the central computer system may cause the alternate MVM to travel to the customer. In some embodiments, the user interface device may be configured to display other types of content such as advertisements, promotions, store information, event information, and news to nearby persons.

In some embodiments, a customer may place an order via a personal mobile device communicating directly with the MVMs and/or via the central computer system. In some embodiments, a user interface program such as a mobile application or a webpage may be provided on the user device that shows the locations of one or more MVMS and/or the contents of the MVM. In some embodiments, a customer may select an item and be provided a list or a map of MVMs that carries the item. In some embodiments, a customer may select an MVM and see the content of the MVM through the user interface. In some embodiments, a customer may select and/or pay for items via the user interface on a personal device. In some embodiments, the MVM may then be configured to dispense items when the presence of the user device is detected, when the customer enter a transaction code, when a customer scans an on-screen transaction identifier (e.g. Barcode, QR code, etc.), and/or otherwise identifies him/herself as the purchaser. In some embodiments, the customer may further request for the MVM to travel to their location with the user interface to receive an item and/or make a purchase. In some embodiment's, the customer's location may be identified via the GPS location of the user device providing the user interface.

In step 204, the MVM communicates its sales record and/or inventory level to the central computer system to allow the central computer system to track the inventory of the MVM. After step 214, the central computer system may select a new destination location for the MVM. In some embodiments, a new destination may be select if the MVM has low sales volume and/or if one or more customers request that the MVM travel to them. In some embodiments, a new destination may be selected based on one or more of predicted foot traffic volume in different areas, weather condition, event schedule, venue hours, etc. In some embodiments, the destination may comprise a venue (e.g. a park, a fairground, a sporting arena, a zoo, a beach area, etc.) and the central computer system may cause the MVM to move from one location within the destination venue to another. For example, the MVM may be instructed to go to the entrance of a sporting arena before a game starts, go near the bathroom area during the game, and go to the exit gate area at the end of the game. In some embodiments, the system may then repeat steps 202, 203, 211-214, and 204 for the new location.

In some embodiments, after step 214, the central computer system and/or the MVM may detect for a low inventory condition at the item dispenser based on tracking the inventory level with sales and/or with sensors in the item dispenser. If a low inventory condition is detected, the central computer system may instruct the MVM to travel to a restocking location to restock its content. In some embodiments, the central computer system and/or the MVM may further monitor the power level of the MVM during one of more steps shown in FIG. 2. If MVM's the power level is low, the central computer system may instruct the MVM to travel to a charging and/or battery replacement station. In some embodiments, the system may be configured send another MVM to replace an MVM with low inventory and/or power.

Figure 3A:
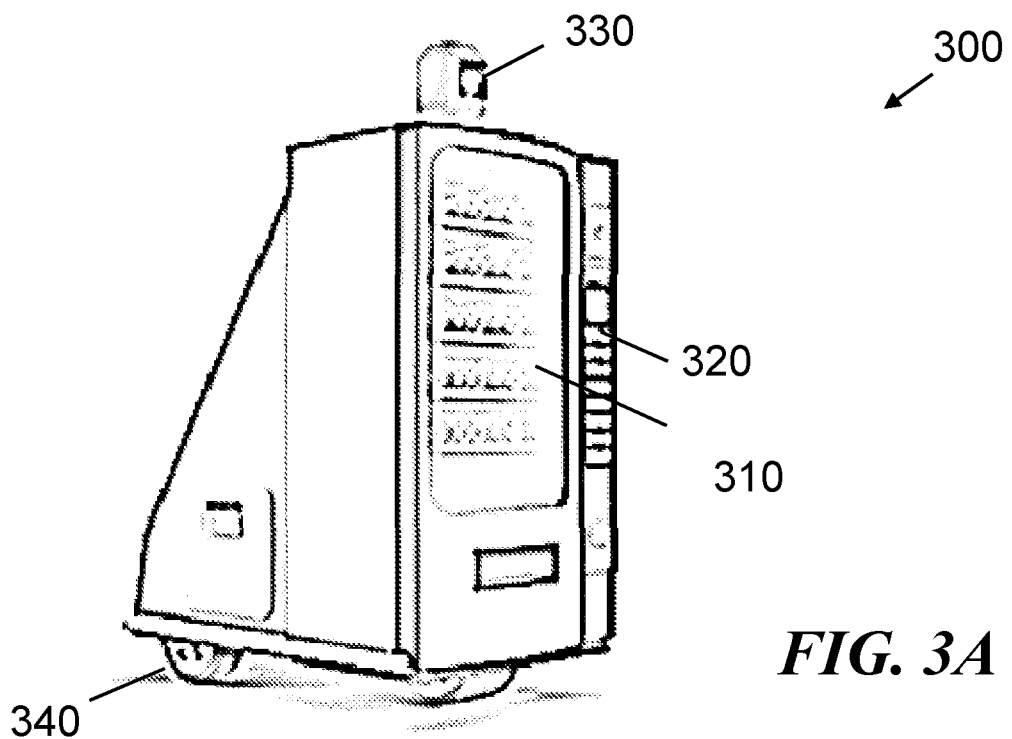
FIGS. 3A and 3B are illustrations of mobile vending vehicles in accordance with several embodiments.
Figure 3B:
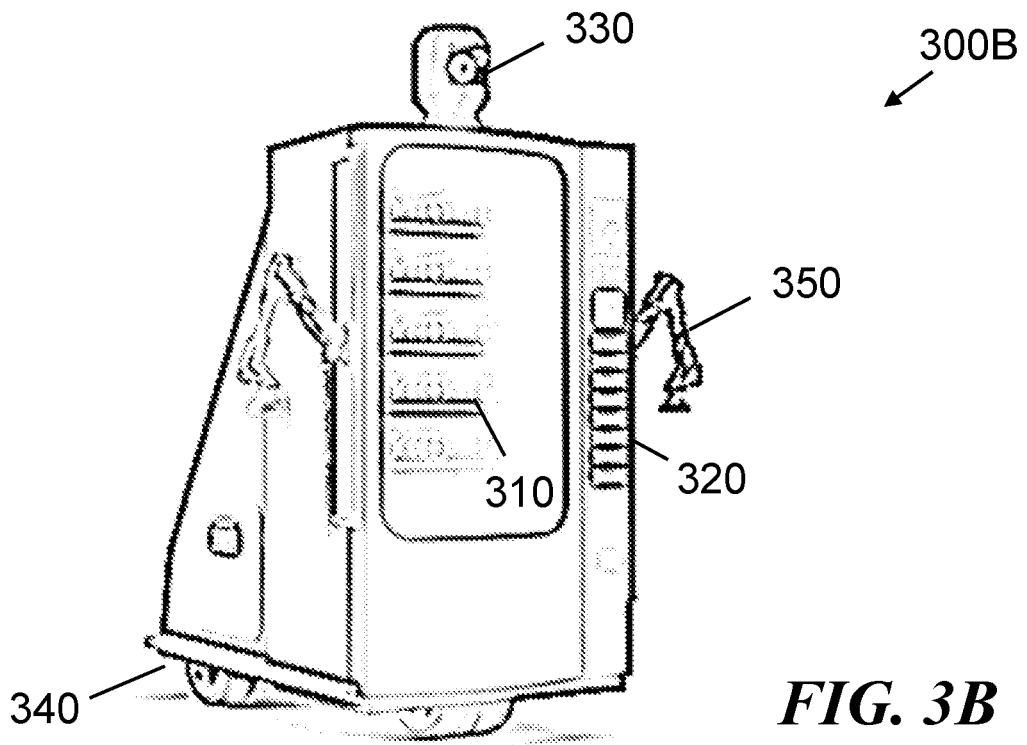

Next referring to FIGS. 3A and 3B, illustrations of exemplary mobile vending machines (MVM) 300 are shown. In some embodiments, the MVM 300 may comprise the MVM 120 described with reference to FIG. 1 herein or a similar system. The MVM 300 shown in FIG. 3A comprises a navigation sensor system 330, a user interface device 320, an item dispenser 310, and a set of wheels 340.

The wheels 340 may be configured to drive and steer the MVM 300 on the ground and travel on roadways to different destinations. While two wheels are shown, an MVM may generally include any number of wheels and/or other locomotion devices without departing from the spirit of the present invention. In some embodiments, the wheels 340 may comprise the motorized wheels 126 described with reference to FIG. 1 herein or a similar system. In some embodiments, one or more of the MVM's power source, navigation control circuit, and motors may be positioned in the portion of the MVM's housing behind the item dispenser 310 and above the rear wheels.

The user interface device 320 may be configured to allow customers to select at least an item from the plurality of items displayed in the item dispenser 310 to purchase. In some embodiments, the user interface device 320 may comprise one or more of a touchscreen, a see-through touch screen, a keypad, one or more buttons, a display screen, a microphone, a speaker, and the like. In some embodiments, the user interface device 320 may comprise a wireless transceiver configured to wirelessly couple with a user device via a short range wireless protocol such as Bluetooth. In some embodiments, the user interface device 320 may comprise one or more payment acceptance devices such as a bank card scanner, a bill receiver, a coin receiver, a mobile payment scanner, a near field communication (NFC) transceiver, a Radio Frequency Identification (RFID) scanner, etc. In some embodiments, the MVM may be configured to receive payment via one or more of a cash receiver, a bank card reader, and a mobile payment reader. In some embodiments, the user interface device 320 may comprise the user interface device 125 described with reference to FIG. 1 herein or a similar device.

The item dispenser 310 is configured to display and dispense a plurality of items for purchase. In some embodiments, the item dispenser 310 may comprise one or more slots and at least one access door for retrieving dispensed items. The item dispenser 310 comprises a window to the storage compartment through which customers can see products carried by the item dispenser 310 prior to making purchases. In some embodiments, the item dispenser 310 may comprise a cooling and/or heating element for regulating the temperature of the stored items. In some embodiments, the item dispenser 310 may comprise mechanisms similar to conventional vending machines for holding and releasing items. In some embodiments, the item dispenser may comprise the item dispenser 129 described with reference to FIG. 1 herein or a similar apparatus.

The navigation sensor system 330 may comprise one or more types of sensors. In some embodiments, the navigation sensor system 330 may comprise one or more of a GPS sensor, an infrared scanner, a motion detector, a laser distance measurer, a sonar, a location sensor, a proximity sensor, an obstacle detector, a range sensor, an image sensor, a sound sensor, a light sensor, a weather sensor, and a data receiver. In some embodiments, the navigation sensor system 330 may comprise the navigation sensor device 124 described with reference to FIG. 1 herein or similar devices. While a rooftop sensor assembly is shown in FIG. 3A, in some embodiments, one or more sensors may be positioned on other parts of the MVM 300. For example, proximity sensors may be positioned around the perimeter of the MVM. Sensors may also be located at multiple locations on the MVM 300.

The MVM 300B shown in FIG. 3B may generally comprise the same or similar components as MVM 300 shown in FIG. 3A. MVM 300B further includes a set of arms 350 attached to the exterior of the MVM 300B. In some embodiments, the arms 350 may be operated by a control circuit of the MVM 300B and configured to automatically load and/or remove items from the item dispenser 310. In some embodiments, the arms 350 may extend and retract to provide stability to the MVM 300B. In some embodiments, the arms 350 may comprise a user interaction device configured perform various movements to provide information and/or entertainment to nearby persons.

The MVMs shown in FIGS. 3A and 3B are provided as examples only. An MVM may comprise various shapes and sizes with components arranged in various ways without departing from the spirit of the present disclosure.

Figure 4:
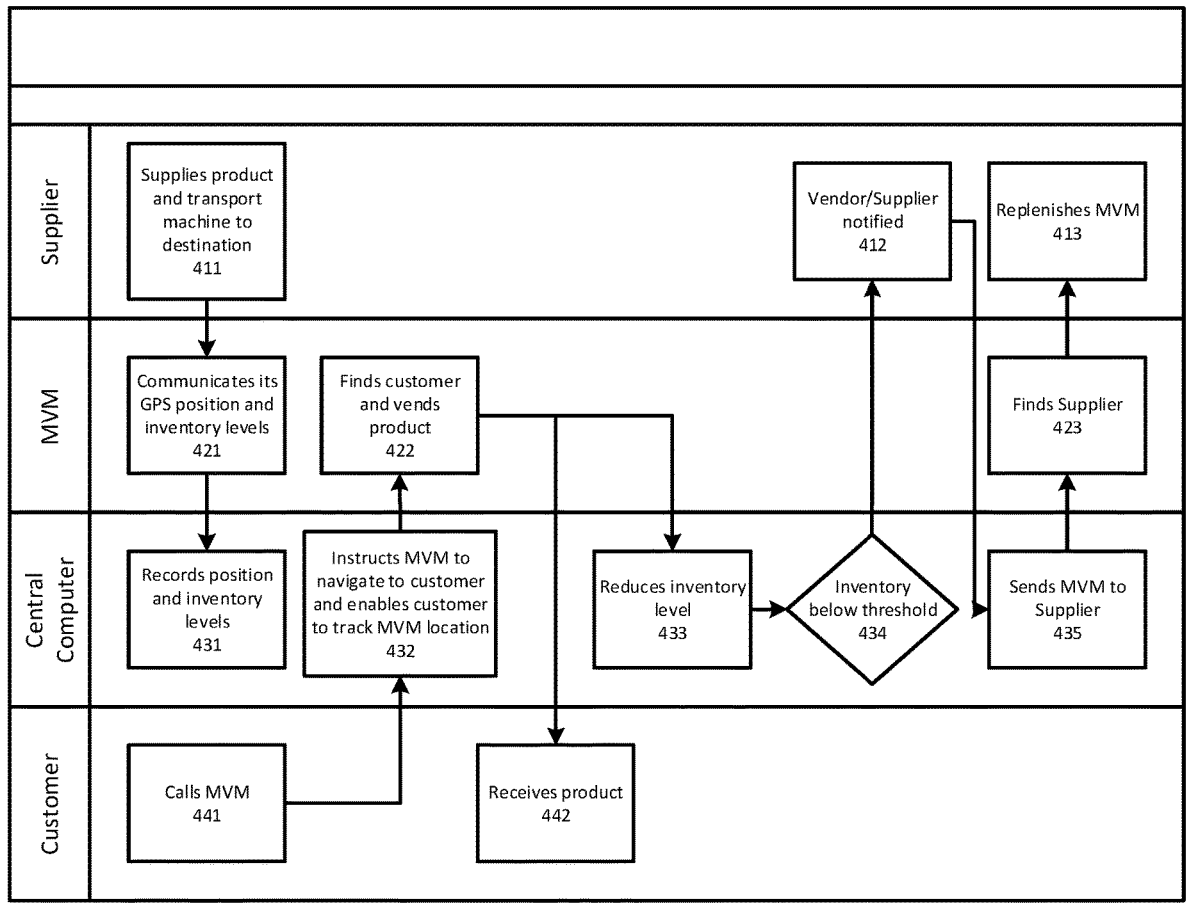
FIG. 4 is a process diagram in accordance with several embodiments.

Referring now to FIG. 4, a process for operating an MVM is shown. In step 411, a supplier supplies products to the MVM and transports the MVM to a destination. Supplier may generally refer to a seller/distributor of products carried by the MVM. In some embodiments, the MVM may be instructed to travel to the destination on its own. In step 421, the MVM communicates its GPS position and inventory levels to the central computer. The GSP position may be determined by a GPS sensor on the MVM and the inventory levels may be determined by an inventory sensor on the MVM, provided by the supplier, and/or tracked by the central computer. In step 431, the central computer records the MVM position and inventory levels.

In step 441, a customer calls for an MVM. In some embodiments, customers may be provided a user interfaces (e.g. mobile application, webpage, web accessible content, kiosks, etc.) that shows nearby MVMs and/or available products for sale. In some embodiments, a customer may request a product and/or a specific MVM in the area. The MVM may generally be carrying with one or more products for sale prior to being called by the customer. In step 432, the central computer instructs the MVM to navigate to the customer. In some embodiments, the central computer further updates the current location of the MVM on the user interface to allow the customer to track the MVM. For example, the user interface may include a map that shows the location of the MVM relative to the location of the customer. In some embodiments, the central computer may further cause the MVM to find the customer based on a mobile device GPS location associated with the customer. In some embodiments, if the customer moves before the MVM reaches the customer, the central computer may cause the MVM to go to a new customer location without further input from the customer. In step 422, the MVM finds the customer and vends products. In some embodiments, the MVM may be configured to get as close to the customer's location as permissible. In some embodiments, the MVM may be configured to go to a pre-selected and/or pre-approved vending location that is close to the customer and notify the customer of its arrival.

In step 442, the customer receives the product from the MVM. In step 433, the central computer system reduces the recorded inventory level of the MVM based on the purchase. In some embodiments, after step 442, the process may return to step 441 for other customers. In some embodiments, the MVM may park itself at the destination and/or roam the premises and dispenser product for purchase by any persons in the area.

In step 434, the central computer system detects that the inventory of the MVM is below a threshold. In some embodiments, thresholds may be set for each individual product (e.g. no product should be sold out) and/or may be set to the collective of products carried by the MVM (e.g. no more than 30% of products should be sold out). In step 412, the central computer system notifies the vendor and/or supplier. The vendor and/or supplier may begin to order and/or prepare the items for replenishing the MVM. In step 435, the MVM is sent to the supplier. In some embodiments, the supplier and/or a supplier location may be selected based on the items to be replenished and/or the MVM's current location. In step 423, the MVM finds the supplier. In step 413, the supplier replenishes the MVM. In some embodiments, after step 413, the process may return back to step 411 and/or 441 for other customers.

Traditional retail stores do not typically have presences at fairs, carnivals, parks, ballgames, and other outdoor events. In some embodiments of systems and methods described herein, products may be provided to customers while they are out and about with MVMs. In some embodiments, an MVMs may be configured to travel to a warehouse to be restocked or be loaded onto a truck for longer trips to destinations.

In some embodiments, an MVM comprises a robotic vending machine that may be deployed to a variety of destinations and bring products to customers for purchase. In some embodiments, a customer may purchase products by using voice commands, see-through touch screen, buttons, smart device, cash, and a credit card. In some embodiments, an MVM may comprise a 3D printing unit configured to print ordered products on-site. In some embodiments, products carried by an MVM may be select based on its deployment location.

In some embodiments, an MVM comprises a robotic vending machine configured to move around different areas to provide customers with the ease of buying products carried by the vending machine right then and there. In some embodiments, in additional to impulse items, MVM may also be stocked with special feature/limited time only items. In some embodiments, items may be selected based on the environment of an MVM. In some embodiments, an MVM may provide easy access to both impulse items and limited time offers to customers who do not wish to walk around to look for items to purchase. In some embodiments, an MVM may be configured to provide a receipt to validate purchases.

In some embodiments, an MVM may be configured to travel to customers. In some embodiments, an MVM may use a smart device GPS system and a digital map application for navigation. In some embodiments, an MVM may communication with a remote central computer via a smart device over a mobile network. In some embodiments, an MVM may comprise one or more of an infrared scanner configured to detect for the proximity of customers and/or a motion detector configured to detect for approaching objects. In some embodiments, an MVM may comprise laser distance measurers positioned in front of one or more tires and pointing towards the ground at an angle (e.g. 45 degrees) to measure the terrain and detect for holes and ledges. In some embodiments, laser distance measurers may be positioned to point outwards from one or more sides of an MVM to detect for objects that are not detected by a motion detector or an infrared sensor. In some embodiments, an MVM may comprise a sonar sensor configured to detect for obstacles in place of or in addition to one or more sensors described herein. In some embodiments, an MVM may comprise one or more cameras for identifying people and recording faces, preferences, and customer behavior. In some embodiments, the cameras may comprise cameras of an on-board smart device.

In some embodiments, an MVM may be configured to receive orders for products through customer inputs received via one or more of a customer's smart device, a touch screen, buttons, and/or voice command. In some embodiments, an MVM may be configured to receive payments through the customer's mobile device, a credit card scanner, a cash receiver, and/or other payment processing methods. In some embodiments, an MVM may further be configured to take delivery orders for products it does not carry.

In one embodiment, a system for mobile vending comprises a mobile vending machine comprising: an item dispenser configured to display a plurality of items for purchase, a set of motorized wheels, a navigation sensor device, a communication device, and, a control circuit configured to navigate the mobile vending machine based on navigation instructions; and a central computer system configured to communicate with the mobile vending machine via the communication device, the central computer system being configured to: determine a destination for the mobile vending machine, provide the navigation instructions to the mobile vending machine to cause the mobile vending machine to travel to the destination using the set of motorized wheels and the navigation sensor device.

In one embodiment, a method for mobile vending comprises communicating with a mobile vending machine comprising: an item dispenser configured to display a plurality of items for purchase, a set of motorized wheels, a navigation sensor device, a communication device, and a control circuit, determining, with a control circuit, a destination for the mobile vending machine, providing the navigation instructions to the control circuit of the mobile vending machine to cause the mobile vending machine to travel to the destination using the set of motorized wheels and the navigation sensor device.

In one embodiment, an apparatus for mobile vending comprises an item dispenser configured to display a plurality of items for purchase, a set of motorized wheels, a navigation sensor device, a communication device, and a control circuit coupled to the navigation sensor device and the communication device, the control circuit being configured to: receive navigation instructions from a remote server via the communication device, cause the set of motorized wheels to carry the item dispenser to a destination based on the navigation instructions while avoiding obstacles in a path of travel based on information detected by the navigation sensor device, and upon arriving at the destination, cause the motorized wheels to position the item dispenser to allow customers to view and make purchases from the item dispenser.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for mobile vending comprising:
    an item dispenser of a mobile vending machine configured to display a plurality of items for purchase;
    a set of motorized wheels;
    a navigation sensor device;
    a communication device; and
    a control circuit coupled to the item dispenser, the navigation sensor device, the set of motorized wheels, and the communication device, the control circuit being configured to:
        navigate, with the set of motorized wheels, the mobile vending machine based on navigation instructions received via the communication device;
    receive a selection of at least an item from the plurality of items displayed in the item dispenser to purchase from a customer; and
    in the event that the customer selects an item unavailable at the mobile vending machine via the item dispenser of the mobile vending machine:
    communicate information associated with an alternate mobile vending machine that carries the item unavailable at the mobile vending machine to the customer;
    wherein the mobile vending machine further comprises a user interface device configured to display an alternate vending machine location for an item not available at the mobile vending machine.

2. The system of claim 1, wherein the item dispenser is further configured to:
    receive payment for one or more of the plurality of items; and
    release the one or more of the plurality of items in response to the payment.

3. The system of claim 2, wherein the item dispenser is configured to receive payment via one or more of a cash receiver, a bank card reader, and a mobile payment reader.

4. The system of claim 1, wherein the item dispenser further comprises a user interface device configured to allow a customer to select at least an item from the plurality of items displayed in the item dispenser to purchase.

5. The system of claim 1, wherein the mobile vending machine further comprises a self-loading mechanism configured to load items into the item dispenser.

6. The system of claim 1, wherein a navigation instruction of the mobile vending machine is determined based on one or more of: current date, current time, upcoming events, current content of the item dispenser, locations of a plurality of other mobile vending machines, and sales history at a plurality of locations.

7. The system of claim 1, wherein the control circuit is further configured to:
    cause the mobile vending machine to travel to a restocking station to be restocked.

8. The system of claim 1, wherein the control circuit is further configured to:
    monitor a stock level of a content of the item dispenser via a stock sensor on the mobile vending machine; and
    instruct the mobile vending machine to travel to a restocking station based on the stock level of the content of the item dispenser.

9. A method for mobile vending comprising:
    navigating, with a control circuit, a mobile vending machine comprising:
        an item dispenser configured to display a plurality of items for purchase;
        a set of motorized wheels;
        a navigation sensor device; and
        a communication device;
    receiving a selection of at least an item from the plurality of items displayed in the item dispenser to purchase from a customer; and
    in the event that the customer selects an item unavailable at the mobile vending machine via the item dispenser of the mobile vending machine:

communicating information associated with an alternate mobile vending machine that carries the item unavailable at the mobile vending machine to the customer;

wherein the mobile vending machine further comprises a user interface device configured to display an alternate vending machine location for an item not available at the mobile vending machine.

10. The method of claim 9, wherein the item dispenser is further configured to:

receive payment for one or more of the plurality of items; and release the one or more of the plurality of items in response to the payment.

11. The method of claim 9, wherein the item dispenser is configured to receive payment via one or more of a cash receiver, a bank card reader, and a mobile payment reader.

12. The method of claim 9, wherein the item dispenser further comprises a user interface device configured to allow a customer to select at least an item from the plurality of items displayed in the item dispenser to purchase.

13. The method of claim 9, wherein the mobile vending machine further comprises a self-loading mechanism configured to load items into the item dispenser.

14. The method of claim 9, wherein a navigation instruction of the mobile vending machine is determined based on one or more of: current date, current time, upcoming events, current content of the item dispenser, locations of a plurality of other mobile vending machines, and sales history at a plurality of locations.

15. The method of claim 9, further comprising:

selecting a plurality of targeted items to be sold via the mobile vending machine at a destination; and causing the mobile vending machine to travel to a restocking station to be stocked with the plurality of targeted items.

16. The method of claim 15, wherein the plurality of targeted items are selected based on one or more of: current date, current time, upcoming events, contents of a plurality of other mobile vending machines in a region, sales history of a plurality of products at the destination, characteristics of the destination, characteristics of an event associated with the destination, and an estimated demographic associated with the destination.

17. The method of claim 9, further comprising:

monitoring a stock level of a content of the item dispenser via a stock sensor on the mobile vending machine; and instructing the mobile vending machine to travel to a restocking station based on the stock level of the content of the item dispenser.

* * * * *